US007686055B2

(12) United States Patent
Gisler et al.

(10) Patent No.: US 7,686,055 B2
(45) Date of Patent: Mar. 30, 2010

(54) WELDING MACHINE FOR JOINING LATERALLY OVERLAPPING WEBS OF SEALING MATERIAL

(75) Inventors: Lukas Gisler, Alpnach Dorf (CH); Adolf Niederberger, Kägiswil (CH)

(73) Assignee: Leister Process Technologies, Kägiswil (CH)

( * ) Notice: Subject to any disclaimer, the term of this patent is extended or adjusted under 35 U.S.C. 154(b) by 420 days.

(21) Appl. No.: 11/853,054

(22) Filed: Sep. 11, 2007

(65) Prior Publication Data

US 2008/0066870 A1 Mar. 20, 2008

(30) Foreign Application Priority Data

Sep. 15, 2006 (DE) .................... 20 2006 014 391 U
Sep. 15, 2006 (DE) .................... 20 2006 014 392 U

(51) Int. Cl.
*B29C 65/02* (2006.01)
(52) U.S. Cl. ................. 156/499; 156/544; 156/574; 156/579
(58) Field of Classification Search ............. 156/499, 156/544, 574, 577, 579
See application file for complete search history.

(56) References Cited

U.S. PATENT DOCUMENTS 4,440,588 A * 4/1984 Stevenson et al. ........... 156/157
4,855,004 A * 8/1989 Chitjian ...................... 156/359
5,935,357 A * 8/1999 Hubbard et al. ............... 156/82
6,537,402 B2 * 3/2003 Pate et al. ..................... 156/71
6,581,663 B2 * 6/2003 Rubenacker et al. ........ 156/391

FOREIGN PATENT DOCUMENTS

DE 20 2006 014170 U1 4/2007
JP 62-092829 4/1987
JP 63-247023 10/1988

* cited by examiner

*Primary Examiner*—Mark A Osele
(74) *Attorney, Agent, or Firm*—Renner, Otto, Boisselle & Sklar, LLP

(57) ABSTRACT

A welding machine for joining overlapping webs of sealing material, with a powered chassis supported by rolls, with a heating system for local heating of the webs of sealing material that is mounted laterally to the chassis (4) and can be placed between the webs of sealing material in edge regions, with at least a first pressure roll installed on the chassis for pressing together the webs of sealing material to be joined by means of heat, where a second pressure roll serving as a replacement pressure roll is placed in the chassis, whose weight rests on the drive shaft and which can be exchanged without tools for the first pressure roll that is coupled to the drive shaft of the welding machine and presses together the bitumen webs to be joined. In addition, the pressure roll (3) may have at least one contact surface made of hard metallic material; and a stripper element is provided whose free end contacts the contact surface or is in close proximity to the same. Therefore, even with materials to be welded that will contaminate the pressure roll, the welding machine is capable of operating for long periods.

10 Claims, 3 Drawing Sheets

WELDING MACHINE FOR JOINING LATERALLY OVERLAPPING WEBS OF SEALING MATERIAL

CROSS REFERENCE TO RELATED APPLICATIONS

This application claims priority under 35 USC §119 to German Application No. 20 2006 014 391.2, filed Sep. 15, 2006, and German Application No. 20 2006 014 392.0, filed Sep. 15, 2006, the entire disclosures of which are incorporated herein by reference.

TECHNICAL FIELD OF THE INVENTION

The present invention relates generally to welding machines, and more particularly to a welding machine for joining overlapping webs of sealing material, with a powered chassis supported by rolls, a heating system for local heating of the webs of sealing material, and at least one pressure roll installed on the chassis for pressing together the webs of sealing material to be joined by means of heat.

DESCRIPTION OF THE RELATED ART

Welding machines are generally known and commonly used for welding films and webs of sealing material, for example those made of plastic, along their overlapping edges. The joining of the webs of sealing material is accomplished by local heating on opposite sides in the edge regions and by pressing them together in hot condition. The pressing process is usually accomplished with at least one pressure roll that is installed on a self-propelled chassis of the welding machine and supports the chassis together with other rolls.

Welding machines known in the art are robust, and a major portion of their weight rests on the pressure roll in order to ensure high contact pressure in the interest of good welding quality. Commonly, the pressure roll also serves as a drive roll because it is pressed firmly against the substrate and, due to its high contact friction, ensures a good power transfer for the forward motion. Such a powered pressure roll is preferably installed at the rear end of the chassis of the welding machine, relative to the welding direction, following the heating system for heating the webs of sealing material.

Welding machines of the type described above can also be used for welding webs of sealing material made of bitumen. In physical terms, bitumen is a thermoplastic material, i.e. its characteristics are dependent on temperature. When it cools down it becomes hard, and when it is heated it passes gradually through all states from solid through viscous to highly fluid. In order to weld webs of bitumen, they must be heated until the bitumen reaches at least a viscous state in the areas to be joined. In such a welding process, the chassis of the welding machine frequently comes in contact with the liquid bitumen and is heavily soiled by it. This is especially true for the rolls supporting the chassis, and the pressure roll pressing the bitumen webs together in hot condition is particularly affected because it runs directly on the overlap, i.e. the plasticized region.

For films resting on a hard substrate, silicone is used as pressure roll material in order to be able to respond elastically to forces acting at an angle. These pressure rolls are also used for welding bitumen and other material of similar elasticity. The quality of such a welded joint depends on the flatness of a contact surface of the pressure roll in order to exert uniform pressure over the width of the overlapping edge regions. When welding bitumen webs, bituminous or similar webs of sealing material, as well as other elastic webs of sealing material, the plasticized material increasingly wets the contact surface and forms unevenly distributed deposits thereon. As a consequence, the pressure roll requires frequent manual cleaning in order to prevent a loss of quality. The cleaning process is time-consuming because the material adheres firmly to the pressure roll. The cleaning process therefore requires a lengthy and undesirable interruption of the welding process.

SUMMARY OF THE INVENTION

The present invention addresses the aforementioned problem by providing a welding machine that can be operated with practically no interruptions.

In accordance with a welding machine of the present invention, a second pressure roll made of the same or different material is installed in the chassis as a replacement pressure roll that can be exchanged without tools for the first drive roll that is connected to a drive shaft. In this way, whenever needed, a clean pressure roll that is not contaminated by bitumen is at hand quickly and without waiting, and can be detached from the chassis in a simple manner. After removal of the first, soiled pressure roll, the second pressure roll can be installed and mounted on the drive shaft.

No tools are needed for removing the first and the second drive roll from the chassis of the welding machine, or for the installation after the exchange. Not having to obtain a tool or wait for one makes for the fastest possible exchange. It serves the purpose if the replacement pressure roll is installed on the chassis so that its main weight rests on the drive roll, thereby optimizing the traction and the contact pressure of the driven pressure roll that propels the chassis and presses together the webs of bitumen.

Advantageously, the chassis has a mount for a second pressure roll that is preferably located behind the first drive roll, relative to the welding direction. When the second pressure roll is inserted in the mount, the center of gravity of the welding machine shifts in the direction of the drive shaft, thereby putting additional weight on the drive shaft, as desired. The mount may have a shaft for accepting the replacement pressure roll, or a—preferably cylindrical—chamber for holding the second pressure roll.

In one embodiment of the invention, the pressure roll is held on the drive shaft by a knurled-head screw with a flange. Here, on its front face, the drive shaft has a matching internal thread into which the knurled-head screw can be screwed. This connects the first drive roll rigidly to the drive shaft, and the knurled-head screw prevents the pressure roll from shifting axially and/or dropping off the drive shaft. The drive roll can be mounted and detached manually by means of the knurled-head screw.

According to another advantageous embodiment of the invention, the welding machine—especially for its use with bitumen—has a pressure roll that has at least one contact surface made of a hard metallic material. In addition, a stripper element is installed on the chassis that contacts, or is in close proximity, to the contact surface of metallic material. By choosing a hard metallic material for the contact surface, any web material adhering to the contact surface can be scraped off by means of a robust stripper element during the forward movement of the bitumen welding machine while it is in operation. The proximity of the stripper element to the contact surface must be such (0-2 mm) that this function is ensured. An important prerequisite here is that the contact surface and the stripper element both are of sufficient stability and strength.

In principle, it is possible to give sufficient stability only to the outer diameter region of the pressure roll by making it of a metallic material. It offers advantages, however, if the entire pressure roll is made of a hard metal or metal alloy. This has the advantage that the weight of the pressure roll is higher than that of the previous roll. Due to the thickness and elasticity of the webs of sealing material, a hard, inelastic pressure roll causes no problems during the welding process. The method known from film material, i.e. welding on a hard substrate with a soft roll, is reversed in this case: a soft bitumen web and a hard pressure roll.

Of course, in order to increase the weight, the other rolls of the bitumen welding machine may also be made of a hard metal. As metallic materials, all materials can be used that have a hard surface and will not deform under the high temperatures occurring during the welding process, such as steel and its alloys, nickel and its alloys, etc.

Advantageously, the pressure roll is made of steel, preferably rust-proof or stainless steel. In principle, other suitable hard metals or metal alloys can also be used. Of importance for their use is their availability and the cost factor of the material.

According to another advantageous embodiment, the stripper element consists of a robust metallic stripper blade whose position can be adjusted relative to the pressure roll.

A welding machine designed in this way permits continuous operation while offering increased contact pressure and a stable position. Depending on the intended use, the replacement pressure roll may be omitted because the cleaning of the pressure roll while installed in the welding machine is ensured.

Additional characteristics and advantages of the invention can be found in the following description of an embodiment in conjunction with the Claims from the drawings. The individual characteristics may be implemented in embodiments of the invention either individually or in combination with others.

DETAILED DESCRIPTION OF THE INVENTION

Figure 1:
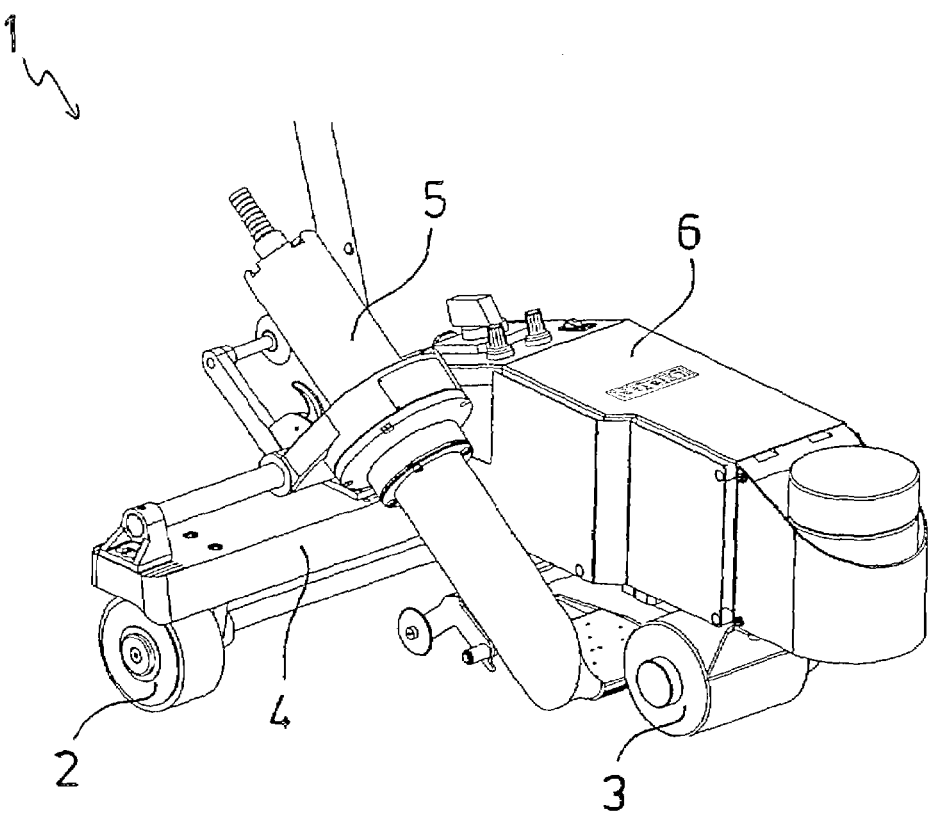
FIG. 1 shows the perspective view of a bitumen welding machine.
Figure 2:
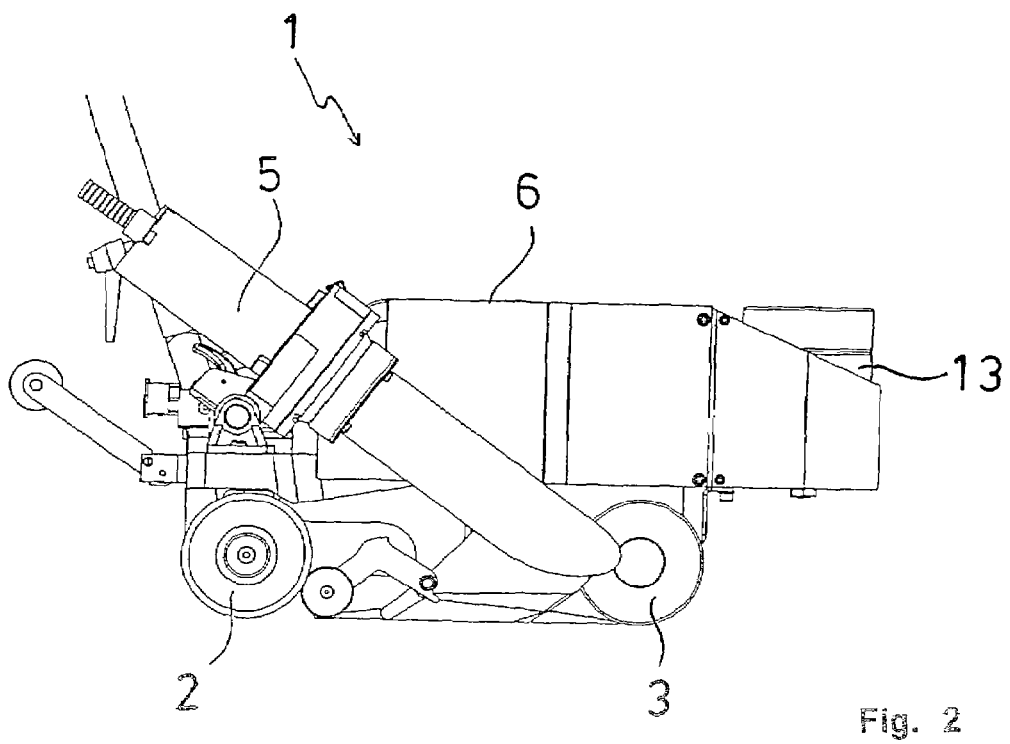
FIG. 2 shows a side view.
Figure 3:
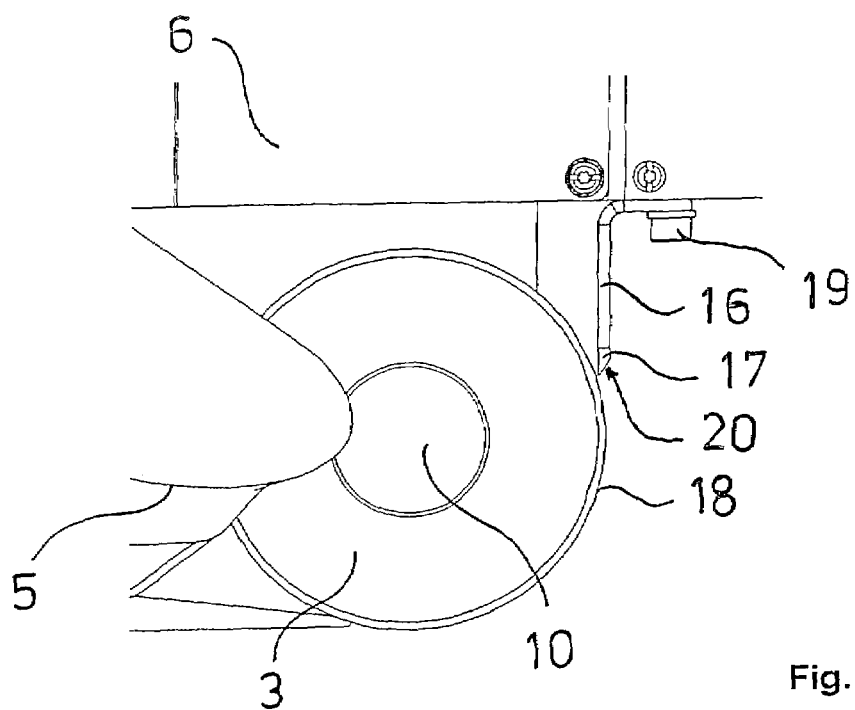
FIG. 3 shows an enlarged detail of FIG. 2 with the pressure roll and the stripper element.
Figure 4:
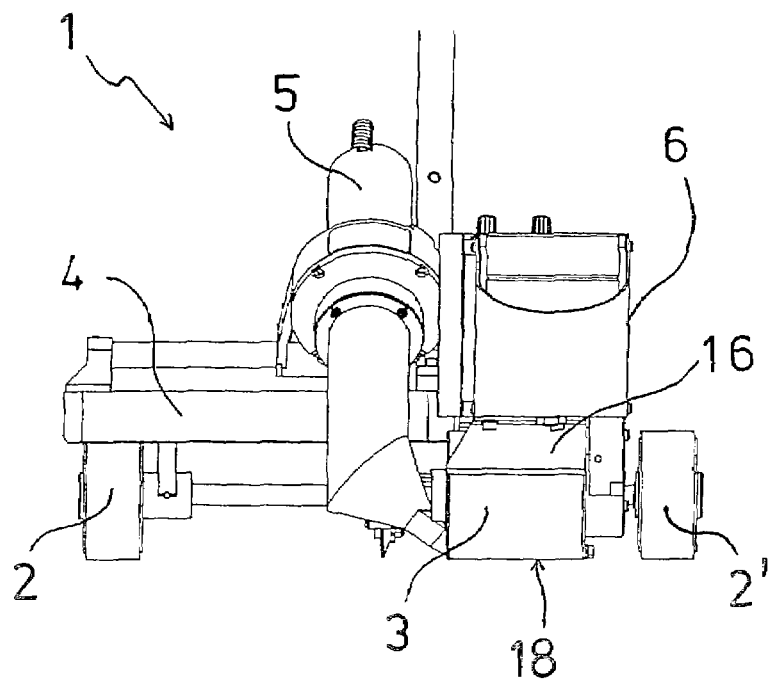
FIG. 4 shows a front view of the bitumen welding machine.

FIG. 1 shows a bitumen welding machine 1 according to the invention for joining overlapping webs of bitumen (not shown in the figure), with a chassis 4 supported by rolls 2, 2', 3, and with a heating system 5 for the local heating of the webs of sealing material that is located next to a housing 6 of the welding machine 1. In the housing 6, a drive system for the roll 3 acting as drive and pressure roll as well as control devices for the drive system and the heating system 5 are provided (not visible in the figure).

Figure 5:
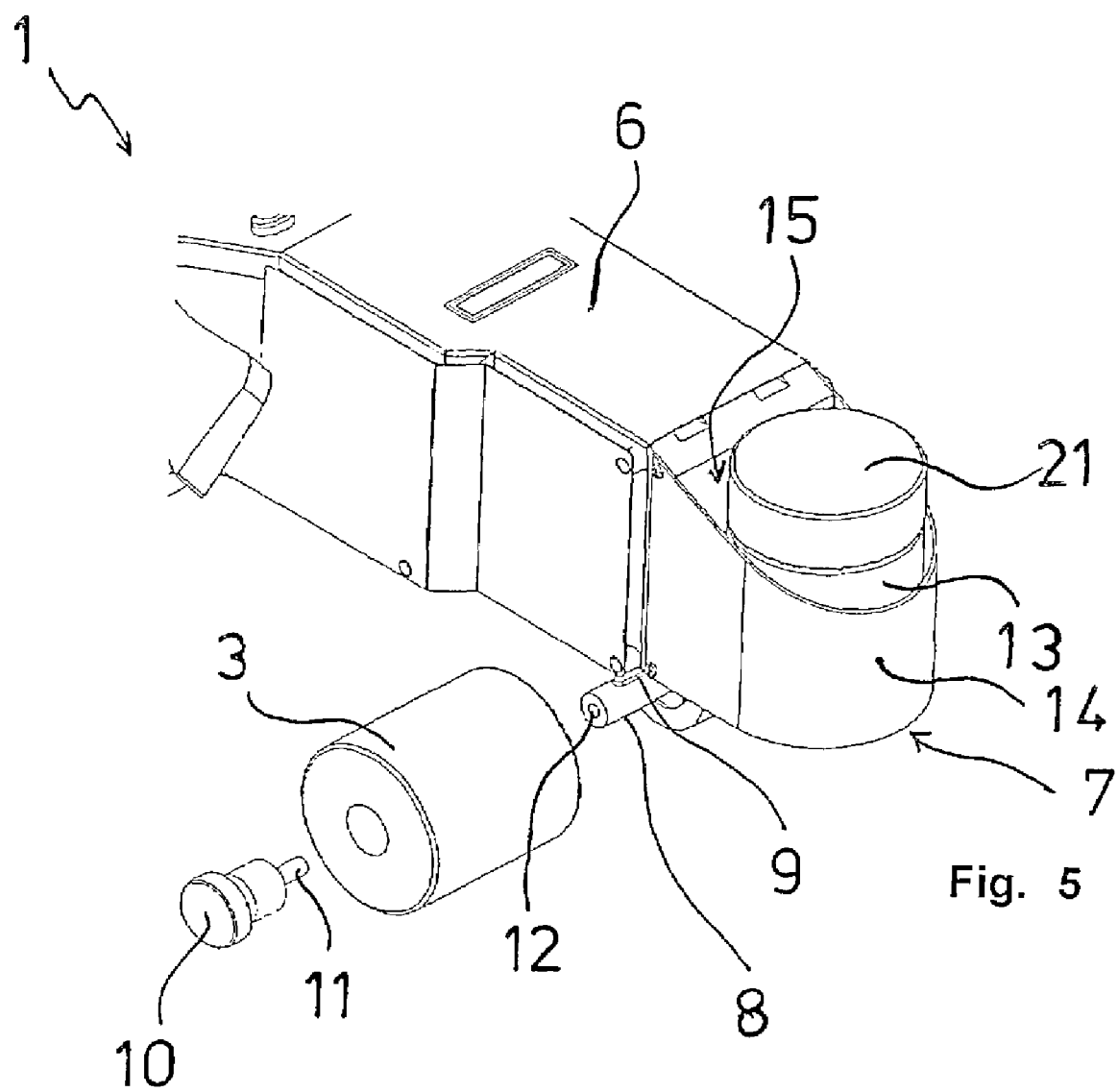
FIG. 5 shows a detail view of the rear end—relative to the welding direction—of the welding machine in FIG. 1, with the pressure roll detached.

Roll 3, referred to hereinafter as the first or driven pressure roll, is mounted at a rear end 7 of the chassis 4, relative to the welding direction. As can be seen from FIG. 5, it is rigidly connected in the axial as well as circumferential direction with a drive shaft 8. In circumferential direction, it is held in position by the raised rib 9 extending along the drive shaft 8 that tightly fits into a matching groove (not visible in the figure) of the first pressure roll 3. In the axial direction, it is held in place by a knurled-head screw 10 with flange that, on the side facing the drive shaft 9, has an external thread 11 that is screwed into an internal thread 12 in the front face of the drive shaft 8.

In the embodiment shown here, the pressure roll 3 is made of stainless steel, and has a weight to match. In this embodiment, a metal angle piece 16 that can be adjusted in the longitudinal direction is attached non-permanently to the housing; with its free end 17, it contacts the contact surface 18 and strips adhering bitumen deposits from the contact surface 18 when the pressure roll 3 rotates forward. At its free end 17, the metal angle piece 16 has a bevel 20 and, for attachment by means of the screws 19, slotted holes (not visible) that allow the adjustment of the metal angle piece 16 relative to the contact surface 18.

In this embodiment, the metal angle piece 16 has different widths, with the free end 17 contacting the contact surface 18 having a width matching the width of the contact surface 18 to which bitumen may adhere.

In the welding direction behind the drive shaft 8 with the first pressure roll 3, a second pressure roll 13 intended to serve as a replacement pressure roll is installed in the housing above the pressure roll 3. The pressure roll 13 is located at a distance from the bitumen webs, and is not contaminated by the liquid bitumen during the welding of the bitumen webs. The second pressure roll 13 can be exchanged for the first pressure roll 3 without tools. It also acts as additional weight, exerting additional force on the drive shaft 8 and the pressure roll 3 due to its weight. When the first pressure roll 3 is soiled by bitumen (not shown in the figure), the replacement pressure roll 13 can be exchanged simply and quickly for the pressure roll 3, thereby allowing a quasi-continuous operation of the welding machine.

In order to store the pressure roll 13, a mount 14 is provided on the housing 6 that has a pot-shaped chamber 15 for the roll 13 that essentially matches the shape of the pressure rolls 3, 13. The storage chamber 15 is open on top so that the replacement pressure roll 13 can be deposited in the storage chamber 15 without needing to be held in place. Therefore, removing as well as inserting the roll 13 into the mount 14 is easier than with a mount that has a separate holding device. The holding plate 21 holds the replacement pressure roll 13 in position via a threaded rod (not visible).

The invention claimed is:

1. A welding machine for joining overlapping webs of sealing material, comprising:
    a powered chassis supported by rolls,
    a heating system for local heating of the webs of sealing material that is mounted laterally on the chassis and can be placed between the webs of sealing material in edge regions,
    at least a first pressure roll installed on the chassis for pressing together the webs of sealing material to be joined by the local heating, the first pressure roll being connected to a drive shaft included in the welding machine, and
    a second pressure roll serving as a replacement pressure roll placed in the chassis, whose weight rests on the drive shaft, and which can be exchanged without tools for the first pressure roll to press together the webs of sealing material to be joined.

2. A welding machine according to claim 1, wherein the chassis includes a mount for the second pressure roll that is located behind the first drive roll, relative to the welding direction.

3. A welding machine according to claim 1, wherein the first pressure roll is held in position on the drive shaft by a flanged knurled-head screw.

4. A welding machine according to claim 1, wherein the first pressure roll has at least one contact surface comprising a hard metallic material.

5. A welding machine according to claim 4, further including a stripper element having a free end that contacts the at least on contact surface or is in close proximity to the at least one contact surface.

6. A welding machine according to claim 4, wherein the pressure roll is made entirely of a hard metallic material.

7. A welding machine according to claim 4, wherein the hard metallic material is steel.

8. A welding machine according to claim 7, wherein the hard metallic material is stainless steel.

9. A welding machine according to claim 5, wherein the stripper element comprises a metallic stripper blade.

10. A welding machine according to claim 9, wherein the metallic stripper blade comprises a metal angle piece.

* * * * *